United States Patent
Bhuiyan et al.

(10) Patent No.: US 12,449,833 B2
(45) Date of Patent: Oct. 21, 2025

(54) REGULATOR PROVIDING SHARED CURRENT FROM MULTIPLE INPUT SUPPLIES

(71) Applicant: Micron Technology, Inc., Boise, ID (US)

(72) Inventors: Ekram H. Bhuiyan, Sunnyvale, CA (US); Jayaprakash Naradasi, Bengaluru (IN); Srinivasa Rao Sabbineni, Hyderabad (IN); Michael Mostovoy, San Ramon, CA (US)

(73) Assignee: Micron Technology, Inc., Boise, ID (US)

( * ) Notice: Subject to any disclaimer, the term of this patent is extended or adjusted under 35 U.S.C. 154(b) by 265 days.

(21) Appl. No.: 17/876,323

(22) Filed: Jul. 28, 2022

(65) Prior Publication Data

US 2023/0288949 A1  Sep. 14, 2023

(30) Foreign Application Priority Data

Mar. 11, 2022 (IN) .............................. 202241013312

(51) Int. Cl.
*G11C 16/30* (2006.01)
*G05F 1/59* (2006.01)

(52) U.S. Cl.
CPC ................ *G05F 1/59* (2013.01); *G11C 16/30* (2013.01)

(58) Field of Classification Search
CPC ............ G05F 1/59; G11C 16/30; G11C 5/147
USPC .......................................................... 365/19
See application file for complete search history.

(56) References Cited

U.S. PATENT DOCUMENTS

| 8,786,359 | B2 | 7/2014 | Bhuiyan |
| 9,343,118 | B2* | 5/2016 | Son ......................... G11C 5/147 |
| 9,640,271 | B2* | 5/2017 | Pan .......................... G11C 5/14 |
| 9,983,607 | B2 | 5/2018 | Murukumpet et al. |
| 10,310,580 | B2 | 6/2019 | Chi et al. |
| 10,444,780 | B1 | 10/2019 | Cheng et al. |
| 10,866,607 | B1* | 12/2020 | Avci ........................ G01S 7/484 |
| 2021/0075316 | A1* | 3/2021 | Oshita ..................... H03K 5/249 |

\* cited by examiner

*Primary Examiner* — Alexander Sofocleous
*Assistant Examiner* — Tracy Hampton
(74) *Attorney, Agent, or Firm* — Brooks, Cameron & Huebsch, PLLC (57) ABSTRACT

Various embodiments of the present disclosure relate to apparatuses and methods for regulators providing shared current from multiple input supplies. A regulator can include a first portion configured to receive a first supply voltage and to output a first current drawn from the first supply voltage by a load, and a second portion configured to receive a second supply voltage. The regulator can include a current control circuit configured to, responsive to a load current corresponding the load meeting a particular criteria, initiate current sharing such that the load current is subsequently shared between the first supply voltage and the second supply voltage.

19 Claims, 5 Drawing Sheets

REGULATOR PROVIDING SHARED CURRENT FROM MULTIPLE INPUT SUPPLIES

PRIORITY INFORMATION

This application claims the benefit of India Provisional Application No. 202241013312, filed Mar. 11, 2022, the contents of which are incorporated herein by reference.

TECHNICAL FIELD

Embodiments of the disclosure relate generally to memory systems, and more specifically, relate to apparatuses and methods for regulators providing shared current from multiple input supplies.

BACKGROUND

A memory system can include a memory sub-system, which can be a storage device, a memory module, or a hybrid of a storage device and a memory module. Examples of a storage device include a solid-state drive (SSD), a Universal Flash Storage (UFS) drive, a secure digital (SD) card, an embedded Multiple Media Card (eMMC), and a hard disk drive (HDD). Examples of memory modules include a dual in-line memory module (DIMM) and various types of non-volatile dual in-line memory modules (NVDIMMs). Memory systems include one or more memory components (e.g., memory devices) that store data. The memory components can be, for example, non-volatile memory components (e.g., NAND flash memory devices) and volatile memory components (e.g., DRAM devices). In general, a host system can utilize a memory system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to apparatuses and methods for regulators providing shared current from multiple input supplies. A memory system can include multiple voltage domains in order to reduce power consumption of the system, such as by using a reduced supply voltage for certain portions of the system that are configured to operate using the reduced supply voltage. The multiple supply voltages provided to a memory system provide power to various different components, which can include interface circuitry (e.g., host interface circuitry and/or memory interface circuitry), memory devices, processing circuitry, etc. The supply voltages can be provided by a host system, for example, and can be supplied directly to various components or through voltage regulators such as low dropout (LDO) regulators, buck regulators, buck-boost regulars, etc.

The current consumption (e.g., load current) corresponding to a particular input supply can be limited, for example, by the host system in accordance with a specification such as a Joint Electron Device Engineering Council (JEDEC) standard. However, situations can arise in which the desired current consumption of components powered by a particular input supply exceeds the specification limit. In such instances, limiting the current consumption can reduce system performance.

Various embodiments of the present disclosure address the above and other deficiencies by providing a regulator configured to share load current from multiple different input supply voltages provided thereto. The particular load current at which sharing occurs (e.g., the current sharing point) can be an adjustable (e.g., programmable) value. The current sharing ratio, which refers to the ratio of the load current provided by the different supply voltages once the current sharing point is reached, is also programmable and can be a constant value or variable as the load current increases. Embodiments of the present disclosure can provide benefits such as increasing the peak current draw from a regulator load in instances in which that peak current draw may exceed the maximum current draw limit from a particular input supply voltage provided by a host, for example. In one example, the regulator can be an LDO that includes a first portion that receives an input power supply corresponding to a particular power domain (e.g., VCCQ), and a second portion that receives an input power supply corresponding to a different power domain (e.g., VCC). Splitting a regulator output current among/between multiple input power supplies can be used for various purposes. For example, the current sharing point can be selected or based on various factors related to managing transient load regulation, optimizing power consumption of a system (e.g., memory system), and/or managing thermal impact/profile of a system.

Figure 1:
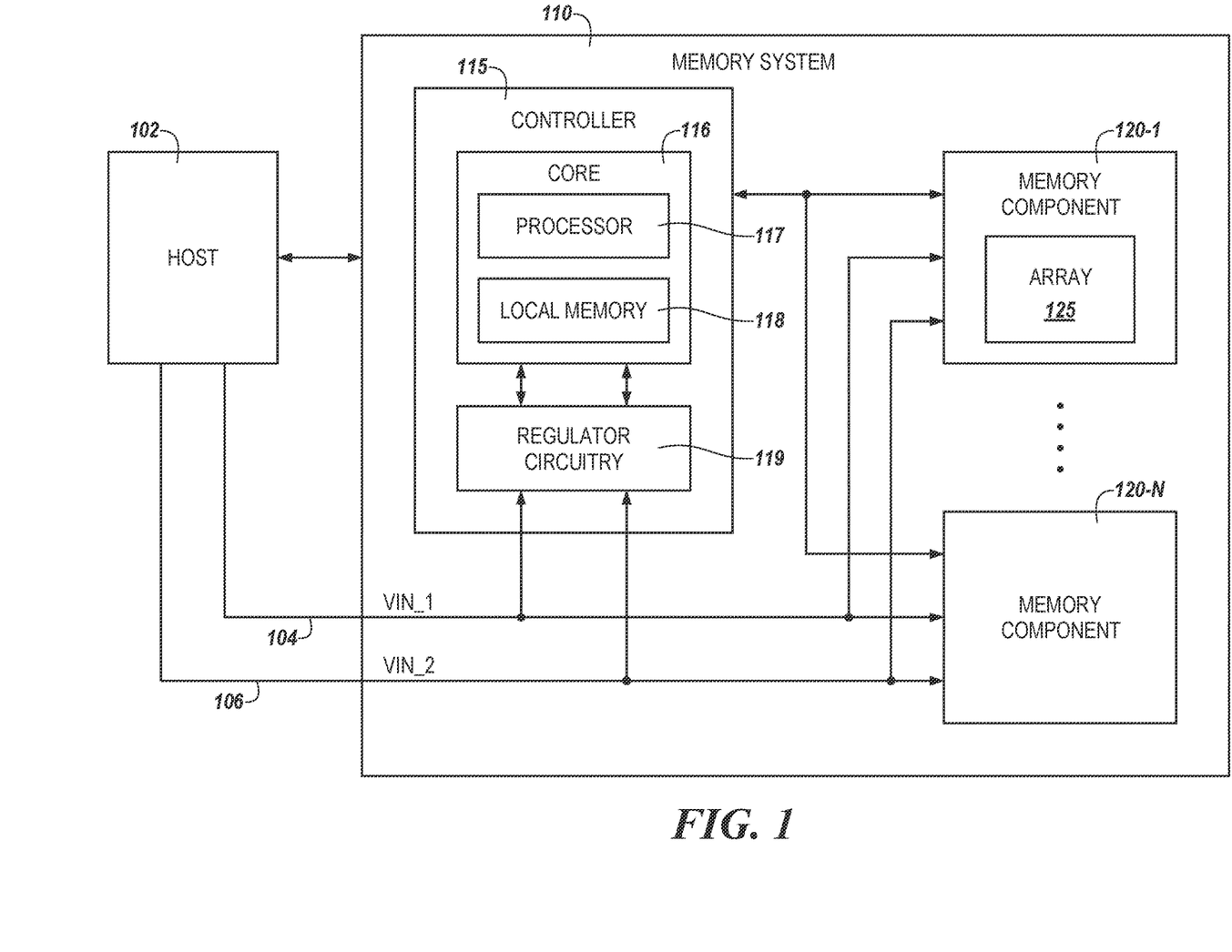
FIG. 1 illustrates an example computing environment that includes a memory system in accordance with some embodiments of the present disclosure.

FIG. 1 illustrates an example computing environment that includes a memory system 110 in accordance with some embodiments of the present disclosure. The memory system 110 includes various components (e.g., circuitry) that can be powered by different input supply voltages that can be associated with different power domains. As shown in FIG. 1, the memory system 110 includes a system controller 115 and a number of memory components 120-1, . . . , 120-N (referred to collectively as memory components 120). The memory components 120 can be volatile memory components, non-volatile memory components, or a combination of such. The controller 115 includes regulator circuitry 119 that can include one or more regulators configured to provide shared current from multiple input supplies in accordance with embodiments described herein below. For example, the regulator circuitry 119 can include a regulator such as regulator 230 shown in FIG. 2 or regulator 430 shown in FIG. 4. However, embodiments are not so limited. For example, the regulator circuitry 119 can also include various other regulator circuitry such as other LDO regulators, buck regulator, boost regulator, buck-boost regulators, etc.

In some embodiments, the memory system 110 is a storage system. An example of a storage system is a solid-state drive (SSD). In some embodiments, the memory system 110 is a hybrid memory/storage sub-system. In general, the computing environment shown in FIG. 1 can include a host system 102 that uses the memory system 110. For example, the host system 102 can write data to the memory system 110 and read data from the memory system 110.

The host system 102 can be a computing device such as a desktop computer, laptop computer, network server, mobile device, or other such computing device that includes a memory and a processing device. The host system 102 can include, or be coupled to, the memory system 110 so that the host system 102 can read data from or write data to the memory system 110. The host system 102 can be coupled to the memory system 110 via a physical host interface (not shown in FIG. 1). As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, a universal flash storage (UFS) interface, a universal serial bus (USB) interface, Fibre Channel, Serial Attached SCSI (SAS), etc. The physical host interface can be used to transmit data between the host system 102 and the memory system 110. The host system 102 can further utilize an NVM Express (NVMe) interface to access the memory components 120 when the memory system 110 is coupled with the host system 102 by the PCIe interface. The physical host interface can provide an interface for passing control, address, data, and other signals between the memory system 110 and the host system 102.

The memory components 120-1, . . . , 120-N can include various combinations of the different types of non-volatile memory components and/or volatile memory components. An example of non-volatile memory components includes a negative-and (NAND) type flash memory. Each of the memory components 120 can include one or more arrays of memory cells (e.g., array 125) such as single level cells (SLCs) or multi-level cells (MLCs) (e.g., triple level cells (TLCs) or quad-level cells (QLCs)). Although non-volatile memory components such as NAND type flash memory are described, the memory components 120 can be based on various other types of memory such as a volatile memory. In some embodiments, the memory components 120 can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells.

The memory system controller 115 (hereinafter referred to as "controller") can communicate with the memory components 120-1, . . . , 120-N to perform operations such as reading data, writing data, or erasing data at the memory components 120 and other such operations. The controller 115 can include hardware such as one or more integrated circuits and/or discrete components, a buffer memory, or a combination thereof. The controller 115 can include a microcontroller, special purpose logic circuitry (e.g., a field programmable gate array (FPGA), an application specific integrated circuit (ASIC), etc.), or other suitable processing circuitry. The controller 115 can include a processing device (e.g., processor 117) configured to execute instructions stored in local memory 118. In the illustrated example, the local memory 118 of the controller 115 includes an embedded memory configured to store instructions for performing various processes, operations, logic flows, and routines that control operation of the memory system 110, including handling communications between the memory system 110 and the host system 102. In some embodiments, the local memory 118 can include memory registers storing memory pointers, fetched data, etc. The local memory 118 can also include read-only memory (ROM) for storing micro-code. While the example memory system 110 in FIG. 1 has been illustrated as including the controller 115, in another embodiment of the present disclosure, a memory system 110 may not include a controller 115, and can instead rely upon external control (e.g., provided by a processor or controller separate from the memory system 110).

In general, the controller 115 can receive commands or operations from the host system 102 and can convert the commands or operations into instructions or appropriate commands to achieve the desired access to the memory components 120. The controller 115 can be responsible for other operations such as wear leveling operations, garbage collection operations, error detection and error-correcting code (ECC) operations, encryption operations, caching operations, and address translations between a logical block address and a physical block address that are associated with the memory components 120. The controller 115 can further include host interface circuitry to communicate with the host system 102 via the physical host interface. The host interface circuitry can convert the commands received from the host system 102 into command instructions to access the memory components 120 as well as convert responses associated with the memory components 120 into information for the host system 102.

In the example shown in FIG. 1, the host 102 provides a first input supply voltage 104 (VIN_1) and a second input supply voltage 106 (VIN_2) to the memory system 110. The input voltages 104 and 106 can be input voltages such as VCC, VCCQ, VCQ2, etc. As an example, the input voltage 104 can be a 1.2V VCCQ supply and the input voltage 106 can be a 2.5V or 3.3V VCC supply; however, embodiments are not limited to particular supply voltage values. In this example, input supply voltage 104 is provided to regulator circuitry 119, which is configured to provide power to various core circuitry 116 as well as to the memory components 120 and/or to a memory interface between the controller 115 and the memory components 120. In this example, the input supply voltage 106 is provided to the regulator circuitry 119 and to the memory components 120 to power various circuitry portions thereof.

The core circuitry 116 can include, for example, physical layer interface (PHY) circuitry, delay-locked loop (DLL) circuitry, phase-locked loop (PLL) circuitry, etc., in addition to processing circuitry such as processor 117. Although the memory system 110 is shown as physically separate from the host 102, in a number of embodiments the memory system 110 can be embedded within the host 102. Alternatively, the memory system 110 can be removable from the host 102.

As used herein, an "apparatus" can refer to various structural components. For example, the computing environment shown in FIG. 1 can be considered an apparatus.

Alternatively, the memory system 110, the host 102, the controller 115, and the regulator circuitry 119 might each separately be considered an apparatus.

Figure 2:
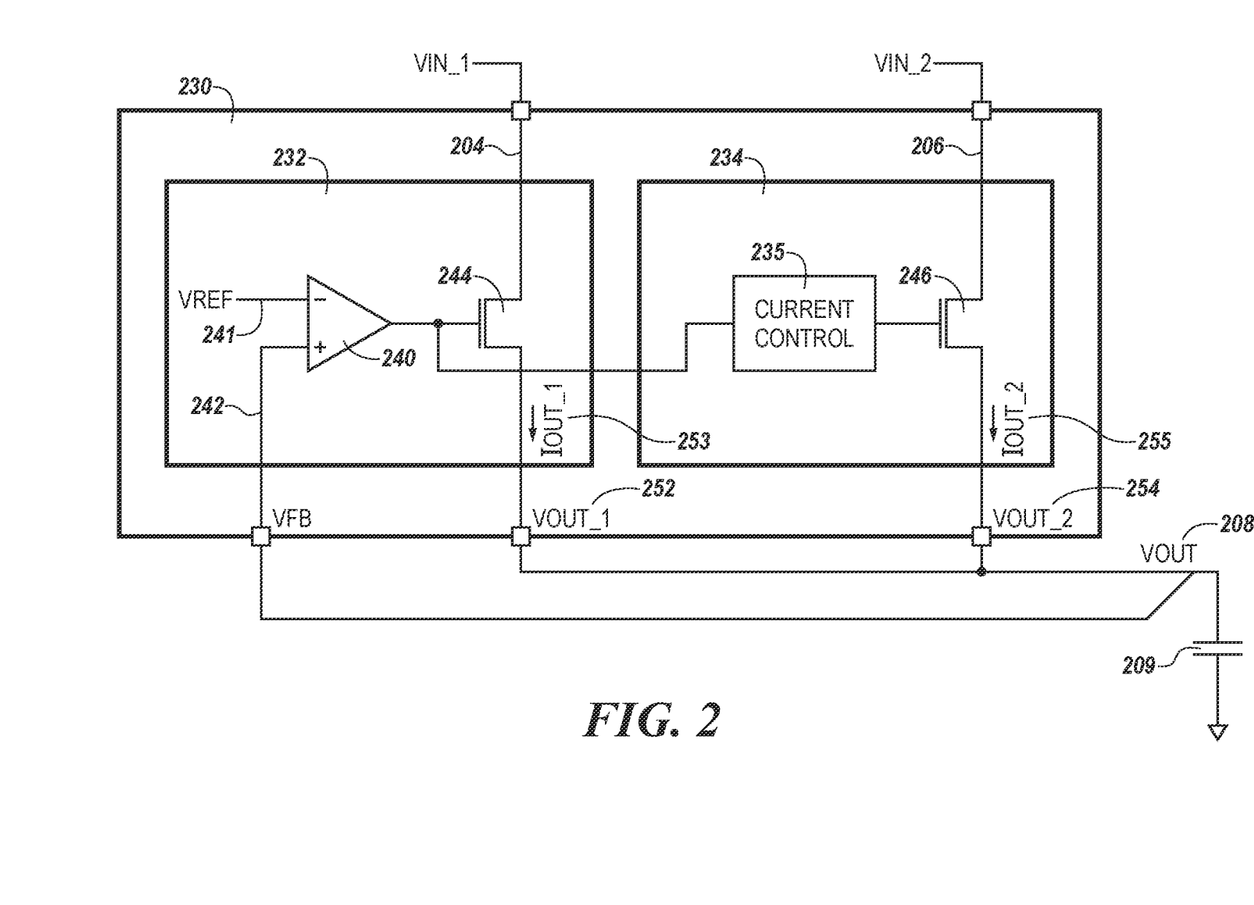
FIG. 2 illustrates an example of a regulator configured to provide shared current from multiple input supplies in accordance with some embodiments of the present disclosure.

FIG. 2 illustrates an example of a regulator configured to provide shared current from multiple input supplies in accordance with some embodiments of the present disclosure. In this example, the regulator 230 is configured to receive a first input voltage supply 204 (VIN_1) and a second input voltage supply 206 (VIN_2). The input supplies 204 and 206 can be analogous to input supplies 104 and 106 described in FIG. 1. The regulator 230 includes a first portion 232 and a second portion 234. The first portion 232 can be referred to as a "main" portion, and the second portion 234 can be referred to as a "current sharing" portion. The regulator 230 can be a LDO configured to provide a regulated output supply voltage 208 (VOUT) to a load (not shown), which can include various passive or active electrical circuit components of a memory system, for example. In this example, the regulated output supply voltage 208 is coupled to a capacitor 209, which can be referred to as a decoupling capacitor and can be used to, for example, decrease the circuit's sensitivity to noise, assist with stabilizing the circuit's response to changes in the load current, etc.

In this example, the first portion 232 is similar to a traditional LDO that comprises an operational amplifier (e.g., an error amplifier) 240 and a pass transistor 244. The output of the error amplifier is coupled to the gate of the pass transistor 244. One input of the error amplifier 240 receives a reference voltage 241 (VREF) and the other input of the error amplifier 240 receives a feedback voltage 242 (VFB) from the output voltage 208 (VOUT). In this example, the pass transistor 244 is a pMOS transistor; however, embodiments are not so limited. The first portion 232 of regulator 230 is configured to maintain a regulated output voltage 252 (VOUT_1). The output current 253 (IOUT_1) corresponding to the first portion 232 varies based on the load to which the output supply voltage 208 (VOUT) is applied.

The current sharing portion 234 of the regulator 230 includes a current control circuit 235 and a pass transistor 246 and is configured to maintain a regulated output voltage 254 (VOUT_2). An example of a current control circuit 235 is described in association with FIG. 3. The transistor 246 includes a first source/drain coupled to the input supply 206 (VIN_2) and a gate that is coupled to the current control circuit 235. As described further below, the current control circuit 235 is configured to control the transistor 246 such that the load current drawn from the regulator 230 is shared (e.g., split) between the input supply 204 and the input supply 206. In various embodiments, the current sharing between input supplies 204 and 206 occurs responsive to required output current 253 (i.e., the required load current draw) meeting a particular criteria such as reaching or exceeding a threshold current value, which can be referred to as the current sharing point. The current sharing point can be, for example, a maximum amount of current allowed to be drawn from the input supply 204; however, embodiments are not so limited. For instance, the current sharing point can be set at a particular current level below the maximum amount of current allowed to be drawn from the input supply 204 in order to prevent the current drawn from input supply 204 from reaching the maximum.

For example, in a number of embodiments the output current 255 (IOUT_2) is zero until output current 253 (IOUT_1) reaches a threshold current value. Once current 253 reaches the threshold, the current control circuit 235 activates to control the output current 255 (e.g., to split the output current drawn between VIN_1 and VIN_2). As described further below, upon initiation of current sharing between supplies 204 and 206, the load current can be shared at a particular ratio (e.g., IOUT_2:IOUT_1). The current sharing ratio can be a constant ratio or the ratio between IOUT_2 and IOUT_1 can be controlled. For example, a programmable current mirror can be used to adjust the current sharing ratio.

Figure 3:
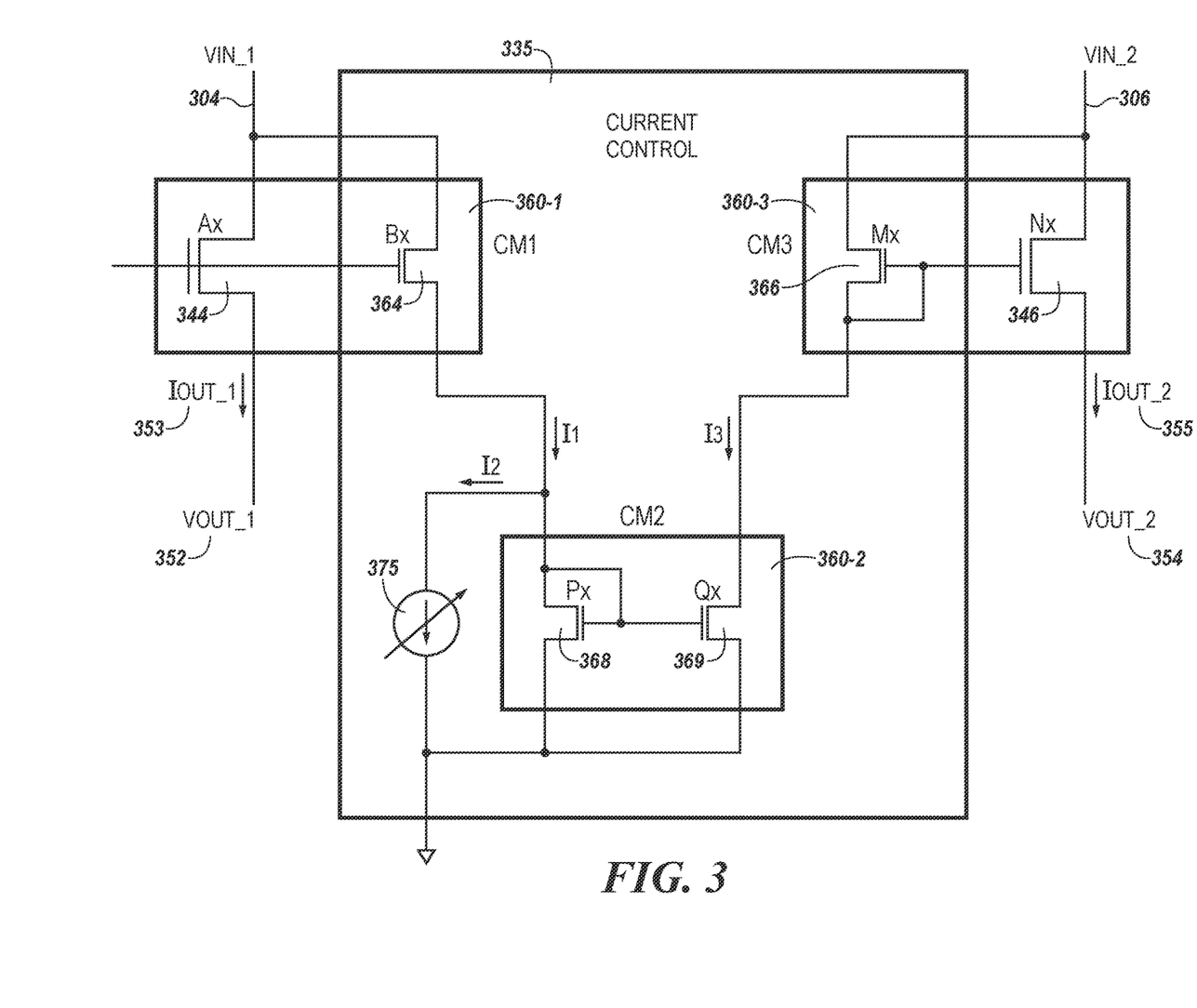
FIG. 3 illustrates a portion of a regulator configured to provide shared current from multiple input supplies in accordance with some embodiments of the present disclosure.

FIG. 3 illustrates a portion of a regulator configured to provide shared current from multiple input supplies in accordance with some embodiments of the present disclosure. FIG. 3 illustrates an example control circuit 335, which can be analogous to control circuit 235 shown in FIG. 2. In this example, the control circuit 335 is coupled to pass transistors 344 and 346 which correspond to respective pass transistors 244 and 246 described in FIG. 2.

In this example, the current control circuit 335 comprises a number of current mirrors 360-1 (CM1), 360-2 (CM2), and 360-3 (CM3) (referred to collectively as current mirrors 360). Current mirror 360-1 comprises transistors 344 and 364, current mirror 360-2 comprises transistors 368 and 369, and current mirror 360-3 comprises transistors 366 and 346. As described further below, the current control circuit 335 is configured to generate an output current 355 (IOUT_2) by a replica current from output current 353 (IOUT_1). The ratio of the replica current 355 to 353 is controlled by the mirror ratios (e.g., Ax:Bx, Px:Qx, and Mx:Nx) corresponding to the current mirrors 360. For example, the ratios of the reference currents to output currents of the respective current mirrors 360 depends on the relative sizes of transistors, which can be represented as Ax:Bx for transistors 344 and 364, Px:Qx for transistors 368 and 369, and Mx:Nx for transistors 366 and 346).

The current control circuit 335 includes a programmable current source 375 that can be used to set the current sharing point for a regulator such as regular 230 shown in FIG. 2. That is, the current source 375 determines at which load current 353 (IOUT_1) from input supply 304 (VIN_1) an output current 355 (IOUT_2) will be delivered from input supply 306 (VIN_2). In operation, no current is delivered from VIN_2 until the output current I1 of current mirror 360-1 becomes greater than I2 due to the current source 375. Once I1 exceeds I2, current flows through current mirror 360-2 and mirror current I3 increases from 0 (I3>0), which then provides a nonzero output current 355 (IOUT_2).

Figure 4:
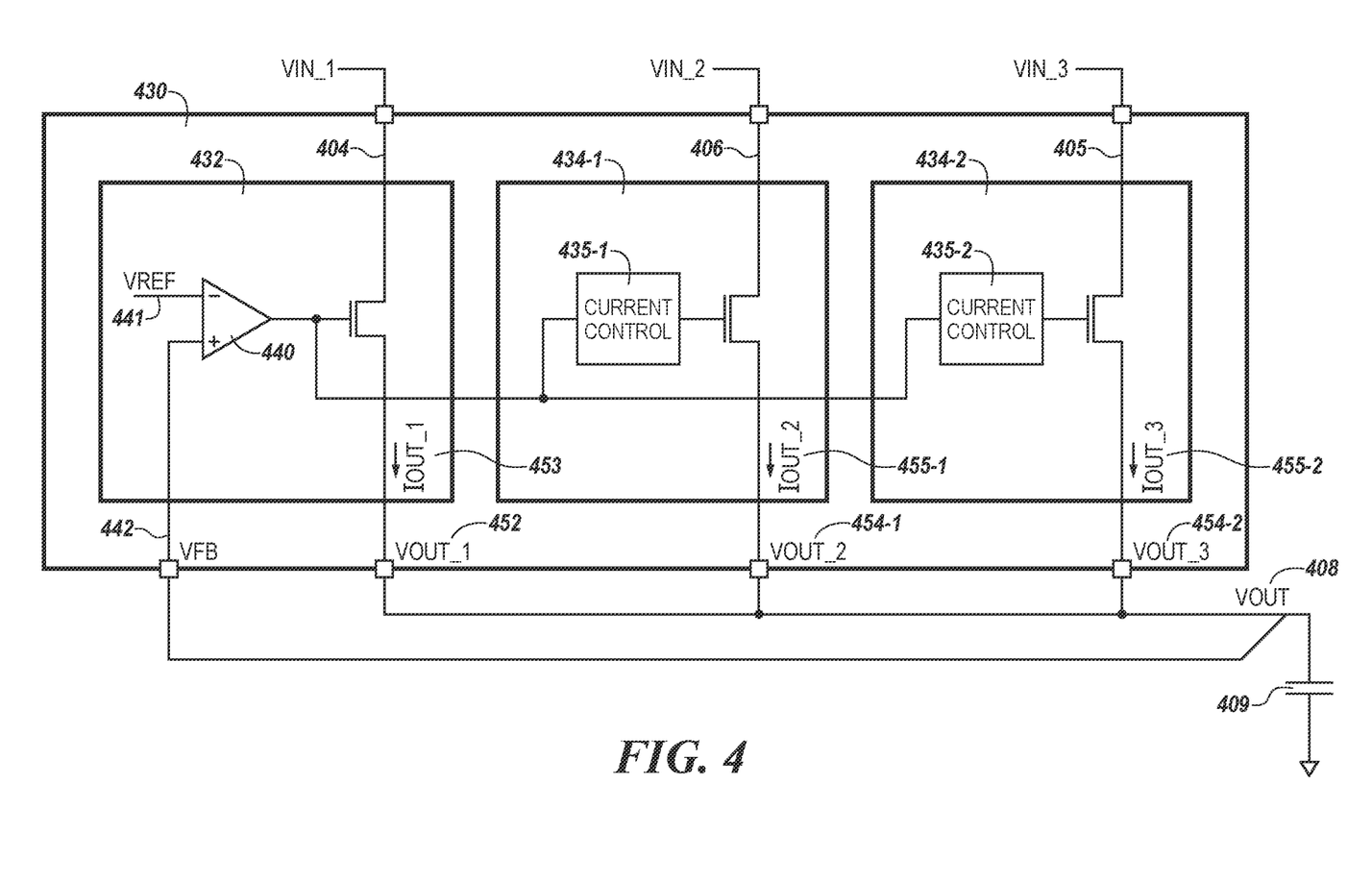
FIG. 4 illustrates an example of a regulator configured to provide shared current from multiple input supplies in accordance with some embodiments of the present disclosure.

FIG. 4 illustrates an example of a regulator configured to provide shared current from multiple input supplies in accordance with some embodiments of the present disclosure. The regulator 430 can operate similarly as the regulator 230 described in association with FIG. 2. However, the regulator 430 is configured to receive three input supplies 404 (VIN_1), 406 (VIN_2), and 405 (VIN_3). The input supplies 404/405/406 may be from different power domains, although embodiments are not so limited.

The regulator 430 includes a first portion 432, a second portion 434-1, and a third portion 434-2. The first portion 432 can be referred to as a "main" portion, and the second and third portions 434-1/434-2 can be referred to as "current sharing" portions. The regulator 430 can be a LDO configured to provide a regulated output supply voltage 408 (VOUT) to a load (not shown), which can include various passive or active electrical circuit components of a memory system, for example. In this example, the regulated output supply voltage 408 is coupled to a capacitor 409, which can be referred to as a decoupling capacitor and can be used to, for example, decrease the circuit's sensitivity to noise, assist with stabilizing the circuit's response to changes in the load current, etc.

In this example, the first portion 432 is similar to a traditional LDO that comprises an operational amplifier (e.g., an error amplifier) 440 and a pass transistor. The output of the error amplifier is coupled to the gate of the pass transistor. One input of the error amplifier 440 receives a reference voltage 441 (VREF) and the other input of the error amplifier 440 receives a feedback voltage 442 (VFB) from the output voltage 408 (VOUT). The first portion 432 of regulator 430 is configured to maintain a regulated output voltage 452 (VOUT_1). The output current 453 (IOUT_1) corresponding to the first portion 432 varies based on the load to which the output supply voltage 408 (VOUT) is applied.

The current sharing portions 434-1 and 434-2 of the regulator 430 include respective current control circuits 435-1 and 435-2 pass transistors. The current control circuits 435-1/435-2 can operate in a similar manner as control circuit 335 described in association with FIG. 3. The pass transistor of portion 434-1 includes a first source/drain coupled to the input supply 406 (VIN_2) and a gate that is coupled to the current control circuit 435-1. Similarly, the pass transistor of portion 434-2 includes a first source/drain coupled to the input supply 405 (VIN_3) and a gate that is coupled to the current control circuit 435-2. The current control circuits 435-1 and 435-2 are configured to control the corresponding respective pass transistors such that the load current draw from the regulator 430 is shared between the input supplies 404, 405, and 406. In various embodiments, the current sharing between input supplies 404, 405, and 406 occurs responsive to required output current 453 (i.e., the required load current draw) meeting or exceeding a threshold current value, which can be referred to as the current sharing point. A separate current sharing point can be used to determine when the output current 455-2 (IOUT_3) drawn from input supply 405 is warranted.

For example, in a number of embodiments the output current 455-1 (IOUT_2) is zero until output current 453 (IOUT_1) reaches a threshold current value. Once current 453 reaches the threshold, the current control circuits 435-1 and/or 435-2 activate to control the output current 455-1 and/or 455-2. Upon initiation of current sharing between supplies 404 and 405/406, the load current can be shared at a particular ratio (e.g., IOUT_2:IOUT_1:IOUT_3). The current sharing ratio can be a constant ratio or an adjustable ratio.

Figure 5:
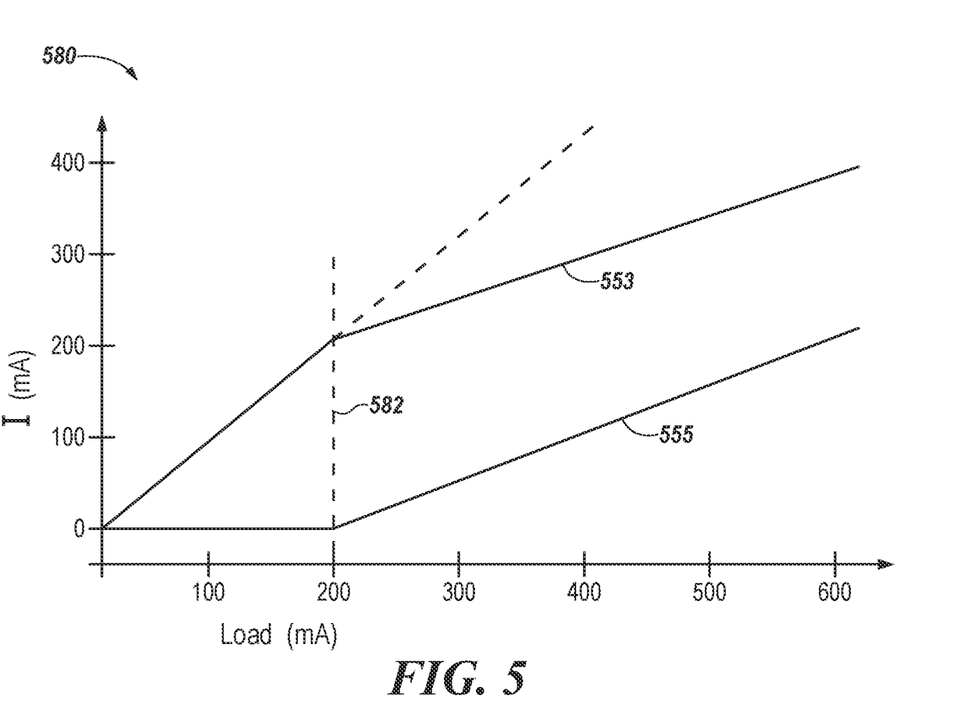
FIG. 5 is a graph illustrating an example of shared currents from multiple input supplies in accordance with some embodiments of the present disclosure.

FIG. 5 is a graph 580 illustrating an example of shared currents from multiple input supplies in accordance with some embodiments of the present disclosure. The x-axis illustrates the load current draw, and the y-axis illustrates the output supply currents corresponding to first and second input supplies. Curve 553 can represent an output supply current (IOUT_1) such as current 253, 353, and 453 described above (e.g., an output supply current drawn from an input supply such as respective input supplies 204, 304, and 404). Curve 555 can represent an output supply current (IOUT_2) such as current 255 or 355 described above (e.g., an output supply current drawn from an input supply such as 206 or 306).

In this example, a current sharing point 582 occurs at a load current of about 200 mA. As shown in graph 580, prior to the load current reaching the current sharing point 582 the load current is provided entirely by the output supply current 553 (i.e., the output supply current 555 is zero). However, when the load current reaches/passes the current sharing point 582 the load current is shared between the output supply currents 553 and 555. As described above the current sharing ratio of currents 553 to 555 can be a constant value once current sharing is initiated (e.g., by a current sharing circuit such as 335), or the current sharing ratio can be variable as the load current increases, for example.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

The figures herein follow a numbering convention in which the first digit or digits correspond to the drawing figure number and the remaining digits identify an element or component in the drawing. Similar elements or components between different figures may be identified by the use of similar digits. For example, 124 may reference element "24" in FIG. 1, and a similar element may be referenced as 324 in FIG. 3. As will be appreciated, elements shown in the various embodiments herein can be added, exchanged, and/or eliminated so as to provide a number of additional embodiments of the present disclosure.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A voltage regulator, comprising:
   a first portion configured to receive a first supply voltage and to output a first current drawn from the first supply voltage by a load;
   a second portion configured to receive a second supply voltage, the second supply voltage being received from a different input supply than the first supply voltage; and
   a current control circuit configured to, responsive to a load current corresponding to the load meeting a current sharing point, initiate current sharing of the load current between the first supply voltage and the second supply voltage; and
   wherein the first portion includes an error amplifier having an output coupled to a gate of a pass transistor and directly connected to the current control circuit.

2. The voltage regulator of claim 1, wherein second portion includes a transistor having a first source/drain configured to receive the second supply voltage and a second source/drain configured to provide a portion of the load current subsequent to the load current meeting the current sharing point.

3. The voltage regulator of claim 1, wherein the current control circuit comprises one or more current mirrors.

4. The voltage regulator of claim 3, wherein a first current mirror of the one or more of current mirrors comprises the pass transistor of the first portion.

5. The voltage regulator of claim 3, wherein the load current shared by the first supply voltage and the second supply voltage includes a first load current portion provided by the first supply voltage and a second load current portion that is provided by the second supply voltage, and wherein the second load current portion is generated by a replica current from the first load current portion.

6. The voltage regulator of claim 1, wherein the current control circuit comprises at least two current mirrors, wherein at least two of the current mirrors have different mirror ratios.

7. The voltage regulator of claim 1, wherein the current sharing point is the load current reaching a threshold current value, and wherein the current control circuit comprises a programmable current source used to set the threshold current value.

8. The voltage regulator of claim 1, wherein the voltage regulator is a low dropout (LDO) regulator.

9. A method, comprising:
   receiving a first supply voltage at a first portion of a voltage regulator, the voltage regulator configured to provide an output current drawn by a load;
   receiving a second supply voltage at a second portion of the voltage regulator, the second supply voltage being received from a different input supply than the first supply voltage;
   prior to the output current drawn by the load meeting a current sharing point, providing the output current from only the first supply voltage; and
   responsive to the output current drawn by the load meeting the current sharing point, initiating, via a current control circuit of the voltage regulator, current sharing between the first supply voltage and the second supply voltage of the voltage regulator, wherein the output current is provided by both the first supply voltage and the second supply voltage; and
   wherein the first portion includes an error amplifier having an output coupled to a gate of a pass transistor and directly connected to the current control circuit.

10. The method of claim 9, wherein the current sharing point corresponds to the output current drawn by the load reaching a threshold current value, and wherein the method includes sharing the output current provided by the first supply voltage and the second supply voltage in accordance with a particular current sharing ratio.

11. The method of claim 10, wherein the method includes adjusting the threshold current value via a programmable current source of the current control circuit.

12. The method of claim 10, wherein the voltage regulator is part of a memory system, wherein the first supply voltage is provided from a host to which the memory system is coupled, and wherein the method includes initiating the current sharing to avoid current drawn from the first supply voltage from reaching or exceeding a peak current draw allowed by the host.

13. The method of claim 9, wherein the method includes:
    receiving a third supply voltage at a third portion of the voltage regulator, the third supply voltage being received from a different input than both the first supply voltage and the second supply voltage; and
    responsive to the output current drawn by the load meeting another current sharing point, initiating, via the current control circuit of the voltage regulator, current sharing between the first supply voltage, the second supply voltage, and the third supply voltage of the voltage regulator such that the output current is provided by the first, the second, and the third supply voltages.

14. An apparatus, comprising:
    one or more memory components of a memory system; and
    a controller of the memory system coupled to the one or more memory components and comprising regulator circuitry configured to provide power to various portions of the memory system;
    wherein the regulator circuitry comprises a regulator having a first input power supply and a second input power supply, the second input power supply being a different input supply than the first input power supply; and wherein the regulator is configured to:
provide load current from the first input power supply until the load current meets a current sharing point; and
responsive to the load current meeting the current sharing point, split the load current between the first input power supply and the second input power supply; and
wherein the regulator includes an error amplifier having an output coupled to a gate of a first pass transistor coupled to the first input power supply, and wherein the second input power supply is coupled to a second pass transistor whose gate is coupled to a current control circuit configured to activate current sharing between the first input power supply and the second input power supply when the load current reaches the current sharing point.

15. The apparatus of claim 14, wherein the regulator is a low dropout (LDO) voltage regulator.

16. The apparatus of claim 15, wherein the current control circuit comprises one or more current mirrors configured to provide a particular current sharing ratio of a portion of the load current provided by the first input power supply to a portion of the load current provided by the second input power supply.

17. The apparatus of claim 14, wherein:
the current sharing point corresponds to the load current reaching a threshold current value; and
the regulator is configured to receive the first input power supply from a host, wherein the host is prevented from allowing a provision of more than a particular amount of current from being drawn from the first input power supply.

18. The apparatus of claim 14, wherein the memory components comprise NOT AND (NAND) memory components, wherein the first input power supply is an input/output (I/O) supply, and wherein the second input power supply is a different supply having a higher voltage than the I/O supply.

19. The apparatus of claim 14, wherein the memory system is one of a solid-state drive (SSD), a Universal Flash Storage (UFS) device, and an embedded Multiple Media Card (eMMC).

* * * * *